United States Patent [19]
Graham

[11] Patent Number: 6,105,753
[45] Date of Patent: Aug. 22, 2000

[54] LINEAR VIBRATORY PARTS FEEDER

[76] Inventor: S. Neal Graham, 12997 Fawns Ridge, Fishers, Ind. 46038

[21] Appl. No.: 08/911,109

[22] Filed: Aug. 14, 1997

[51] Int. Cl.[7] .................................................. B65G 27/08
[52] U.S. Cl. .......................................... 198/763; 198/769
[58] Field of Search ................................... 198/389, 763, 198/391, 769

[56] References Cited

U.S. PATENT DOCUMENTS

| | | | |
|---|---|---|---|
| 2,819,788 | 1/1958 | Howard . | |
| 2,872,019 | 2/1959 | Owen ....................................... | 198/389 |
| 3,240,332 | 3/1966 | Grunwald . | |
| 3,729,090 | 4/1973 | Hacker . | |
| 3,786,912 | 1/1974 | Taylor . | |
| 3,845,857 | 11/1974 | Doty . | |
| 4,275,978 | 6/1981 | Brooks et al. ........................... | 198/763 |
| 4,809,843 | 3/1989 | Dietzsch . | |
| 5,285,890 | 2/1994 | Stearns ................................... | 198/763 |
| 5,462,155 | 10/1995 | Demar et al. . | |
| 5,489,019 | 2/1996 | DiNanno et al. . | |
| 5,630,497 | 5/1997 | Graham ................................... | 198/391 |

*Primary Examiner*—Jospeh E. Valenza
*Attorney, Agent, or Firm*—Woodard, Emhardt, Naughton, Moriarty & McNett

[57] ABSTRACT

A linear vibratory parts feeder is formed from modular components detachably mounted to one another. A counterweight is detachably mounted to a reversible mounting plate and a plurality of lower spring anchors are detachably mounted to the counterweight. A corresponding plurality of upper spring anchors are detachably mounted to a linear parts transport track, and a drive springs are detachably mounted to corresponding pairs of upper and lower spring anchors. The counterweight may be detachably mounted to either one of opposite mounting surfaces of the mounting plate, which is configured to permit complete access to all feeder components and further to permit placement of upstream and downstream feeder units in close proximity to the feeder of the present invention. The counterweight and spring anchors are configured to maximize the vibratory drive efficiency of this feeder.

26 Claims, 6 Drawing Sheets

LINEAR VIBRATORY PARTS FEEDER

FIELD OF THE INVENTION

The present invention relates generally to parts feeding and sorting apparatuses, and more specifically to such apparatuses including a linear parts transporting track mounted to a vibratory drive unit.

BACKGROUND OF THE INVENTION

Vibratory parts feeders are commonly known apparatuses for providing oriented parts from a mass of disoriented parts, for transporting parts along a processing path, and/or for feeding and maintaining a predetermined quantity of parts to a downstream parts orienting feeder. A common requirement of any of the foregoing parts feeders is a drive unit operable to impart the necessary vibratory feed motion to the parts container.

In accordance with one known class of vibratory parts feeders, an elongated linear parts transporting track is mounted to a suitable drive unit wherein the drive unit is operable to urge parts along the track by vibrating the track upwardly and toward the desired direction. An example of one known linear vibratory parts feeder 10 of the type just described is shown in FIG. 1.

Referring to FIG. 1, vibratory parts feeder 10 includes a counterweight 12 connected to track mounting members 14 via a pair of flat leaf springs 16. Typically leaf springs 16 are connected directly to counterweight 12 and track mounting members 14 via threaded fasteners 17 engaged within complementary bores provided therein. Track mounting members 14 are typically formed integral with, or are permanently attached to, linear parts transporting track 18.

Track 18 is driven and vibrated back and forth typically by an electromagnetic drive unit 20 attached to counterweight 12, which has a corresponding armature plate 22 extending from one of the track mounting members 14. The leaf springs 16 are inclined as illustrated so that the track 18, when driven by drive unit 20, moves upwardly and in the direction of armature plate 22 as springs 16 are caused to bend in a direction perpendicular to the flatness thereof. The movement of track 18 thus causes parts therein to move in the direction indicated by arrow 15.

Counterweight 12 is mounted to a base plate 24 having a pair of isolator blocks 26 affixed thereto. A pair of isolator springs 28 connect isolator blocks 26 to counterweight 12 such that an air gap is established between the counterweight 12 and base plate 24, and between counterweight 12 and isolator blocks 26. Typically, isolator springs 28 are connected directly to counterweight 12 via threaded fasteners 27 engaged within complementary bores provided therein. The attachment of counterweight 12 to base plate 24 via isolator blocks 26 and isolator springs 28 serves to minimize the transfer of vibration from counterweight 12 to base plate 24 as is known in the art.

Base plate 24 further includes a pair of mounting ears 30 and 34 attached thereto as illustrated. Mounting ear 30 is attached to base plate 24 along one side thereof adjacent one end of base plate 24, and defines a bore therethrough for receiving fastener 32 therein, wherein fastener 32 secures the corresponding end of base plate 24 to a supporting surface or body. Mounting ear 34 is attached to an opposite end of base plate 24 and similarly defines a bore therethrough for receiving fastener 36 therein, wherein fastener 36 secures the corresponding end of base plate 24 to the supporting surface or body. Both fasteners 32 and 36 are vertically adjustable within mounting ears 30 and 34 respectively to thereby adjust the height of feeder 10 in relation to the supporting surface and in relation to both upstream and downstream parts feeding components.

While the foregoing vibratory parts feeder 10 has been widely used within the parts feeding and sorting industry, it has several drawbacks associated therewith. For example, if any damage occurs to the bores provided within counterweight 12 for receiving fasteners 17 and/or 27, either due to accident or normal wear, the entire counterweight 12 must be replaced. Such replacement can be costly, wasteful and time consuming, particularly if only one such bore is damaged. As a related example, if any damage occurs to any of the track mounting members 14, which are typically formed integral with or permanently attached to parts transporting track 18, the entire track/mounting member arrangement must be replaced which, again, can be costly, wasteful and time consuming. As another example, mounting ear 34 of base plate 24 is positioned in axial alignment with feeder 10 which tends to interfere with the placement of an upstream parts feeder component such as a bowl-type vibratory parts feeder/orienter. Mounting ear 34 further has a tendency to interfere with mounting/demounting access to isolator spring 28, particularly when fastener 36 is adjusted to extend upwardly from within mounting ear 34. As still another example, the direction of operation between drive unit 20 and armature plate 22 is, due to the mounting thereof, set at an angle relative to the operating direction of drive springs 16. As a result, the efficiency of drive unit 20 is adversely affected.

What is therefore needed is an improved linear vibratory parts feeder which overcomes the foregoing shortcomings of known linear vibratory parts feeders and does not introduce new or further problems therewith. Ideally, such an improved linear vibratory parts feeder should be configured such that only minor and easily removable parts require replacement due to damage. Further, such a feeder should include a mounting plate that is adaptable to accommodate access to the feeder hardware and placement of both upstream and downstream parts feeder components. Finally, such a feeder should be designed to provide for maximum efficiency in the transfer of vibratory motion from the vibratory drive unit to the parts transporting track.

SUMMARY OF THE INVENTION

Many of the shortcomings of the described in the BACKGROUND section are addressed by the present invention. In accordance with one aspect of the present invention, a linear vibratory parts feeder comprises a counterweight, a linear parts track, a plurality of lower spring anchors detachably mounted to the counterweight, a corresponding plurality of upper spring anchors detachably mounted to the linear parts track, a plurality of drive springs, wherein each of the drive springs are detachably mounted to a corresponding pair of the plurality of upper and lower spring anchors, and means for vibrating the linear parts track relative to the counterweight.

In accordance with another aspect of the present invention, a linear vibratory parts feeder comprises a counterweight defining a top surface, an opposite bottom surface, a pair of side portions extending therebetween, a first end and a second opposite end defining a longitudinal axis therebetween, a linear parts track, a plurality of drive springs connected between the top surface of the counterweight and the linear parts track, means for vibrating the linear parts track relative to the counterweight against a force of the plurality of drive springs, and a mounting plate detachably mounted to the counterweight and extending along the bottom surface thereof, wherein the mounting plate defines a plurality of bores therethrough adjacent either of the side portions of the counterweight and away from the longitudinal axis of the counterweight, and wherein each of the bores adapted to receive a fastener therethrough for securing the mounting plate to a support surface.

In accordance with yet another aspect of the present invention, a linear vibratory parts feeder comprises a counterweight defining a longitudinal axis from a first end to an opposite second end thereof, wherein the counterweight has a top surface that is generally sloped downwardly from the first end toward the second end at a predefined angle relative to the longitudinal axis, a plurality of drive springs attached at one end to the top surface of the counterweight, a plurality of spring mounting members each attached to an opposite end of a corresponding one of the plurality of drive springs. Each of the plurality of spring mounting members have a top surface facing away from the top surface of the counterweight and define a recess therein that is sloped downwardly in a direction opposite to the downward slope of the top surface of the counterweight, an elongated linear parts track detachably mounted within the recesses of the plurality of spring mounting members, and means for vibrating the linear parts track relative to the counterweight against a force of the plurality of drive springs.

One object of the present invention is to provide an improved linear vibratory parts feeder of modular construction.

Another object of the present invention is to provide such a linear vibratory parts feeder having attached to a mounting plate configured to permit access to all components of the feeder and to permit placement of upstream and downstream feeder units in close proximity to either end thereof.

Yet another object of the present invention is to provide a linear vibratory parts feeder configured to maximize the vibratory drive efficiency thereof.

These and other objects of the present invention will become more apparent from the following description of the preferred embodiments.

DESCRIPTION OF THE PREFERRED EMBODIMENTS

Figure 1:
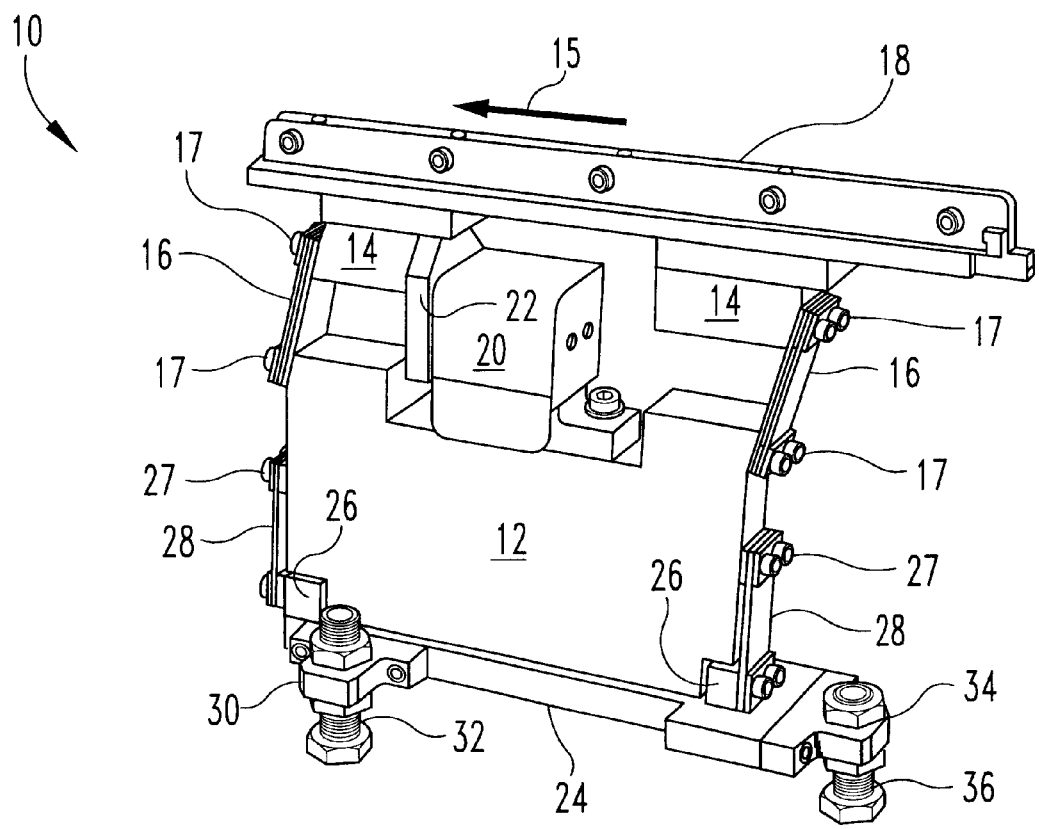
FIG. 1 is a perspective view illustrating a known linear vibratory parts feeder.

For the purposes of promoting an understanding of the principles of the invention, reference will now be made to the embodiments illustrated in the drawings and specific language will be used to describe the same. It will nevertheless be understood that no limitation of the scope of the invention is thereby intended, such alterations and further modifications in the illustrated devices, and such further applications of the principles of the invention as illustrated therein being contemplated as would normally occur to one skilled in the art to which the invention relates.

Figure 2:
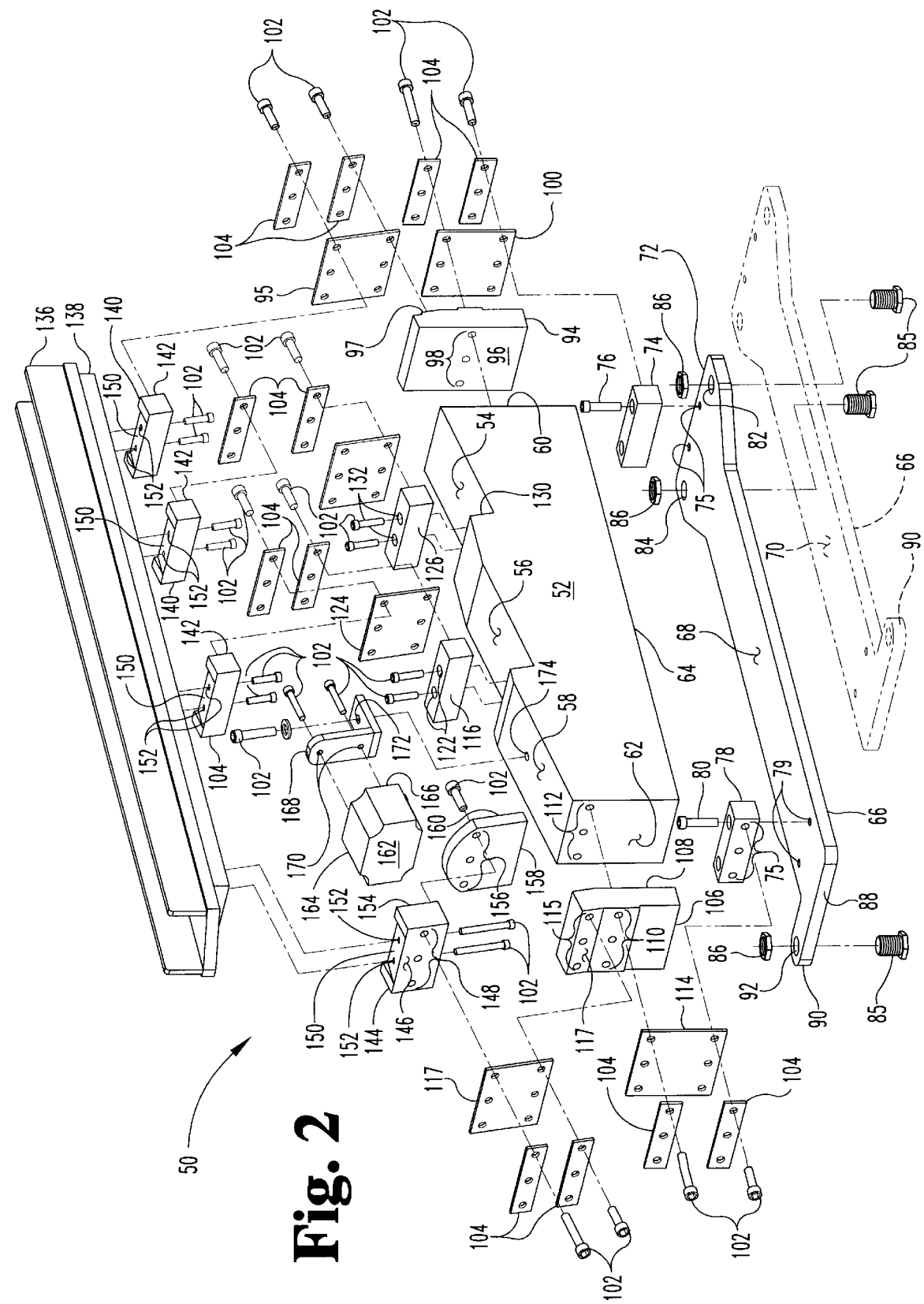
FIG. 2 is an assembly drawing illustrating one embodiment of a linear vibratory parts feeder, in accordance with the present invention.

Referring now to FIG. 2, one preferred embodiment of a linear vibratory parts feeder 50, in accordance with the present invention, is shown. As will be more fully described hereinafter, one advantageous feature of the vibratory parts feeder of the present invention is its modular construction. Thus, as the various modular components of feeder 50 wear out or become damaged, such as those components defining bores therein or therethrough, threaded or otherwise, only the damaged or worn out component(s) need be replaced. This feature correspondingly provides a savings both monetarily and in down time.

Central to linear vibratory parts feeder 50 is a counterweight 52 having a top surface which defines number of inclined surfaces 54, 56 and 58 therein between opposite ends 60 and 62. In a preferred embodiment, three such inclined surfaces are provided, although the present invention contemplates defining any number of inclined surfaces in the top surface of counterweight, wherein the number of drive springs associated with feeder 50 is generally equal to the number of inclined surfaces plus one.

In accordance with an important aspect of the present invention, a mounting plate 66 is provided for mounting counterweight 52 thereto. Mounting plate 66 is preferably reversible in that counterweight 52 may be mounted thereto, as will be described hereinafter, such that the bottom surface 64 of counterweight 52 faces either the top surface 68 of plate 66 or the bottom surface 70 thereof as shown in phantom in FIG. 2. One end 72 of mounting plate 66 defines a plurality of bores 75, preferably two, therethrough which align with similar bores defined through isolator block 74. A pair of fasteners 76 extend through the bores defined through isolator block 74 and into engagement with bores 75 to thereby detachably mount isolator block 74 to mounting plate 66. Mounting plate 66 further defines a second pair of bores 79 therethrough adjacent an opposite end 88 thereof which align with similar bores defined through isolator block 78. A pair of fasteners 80 extend through the bores defined through isolator block 78 and into engagement with bores 79 to thereby detachably mount isolator block 78 to mounting plate 66. Preferably, bores 75 and 79 are threaded as are fasteners 76 and 80 to thereby provide for threaded engagement therebetween.

Figure 5:
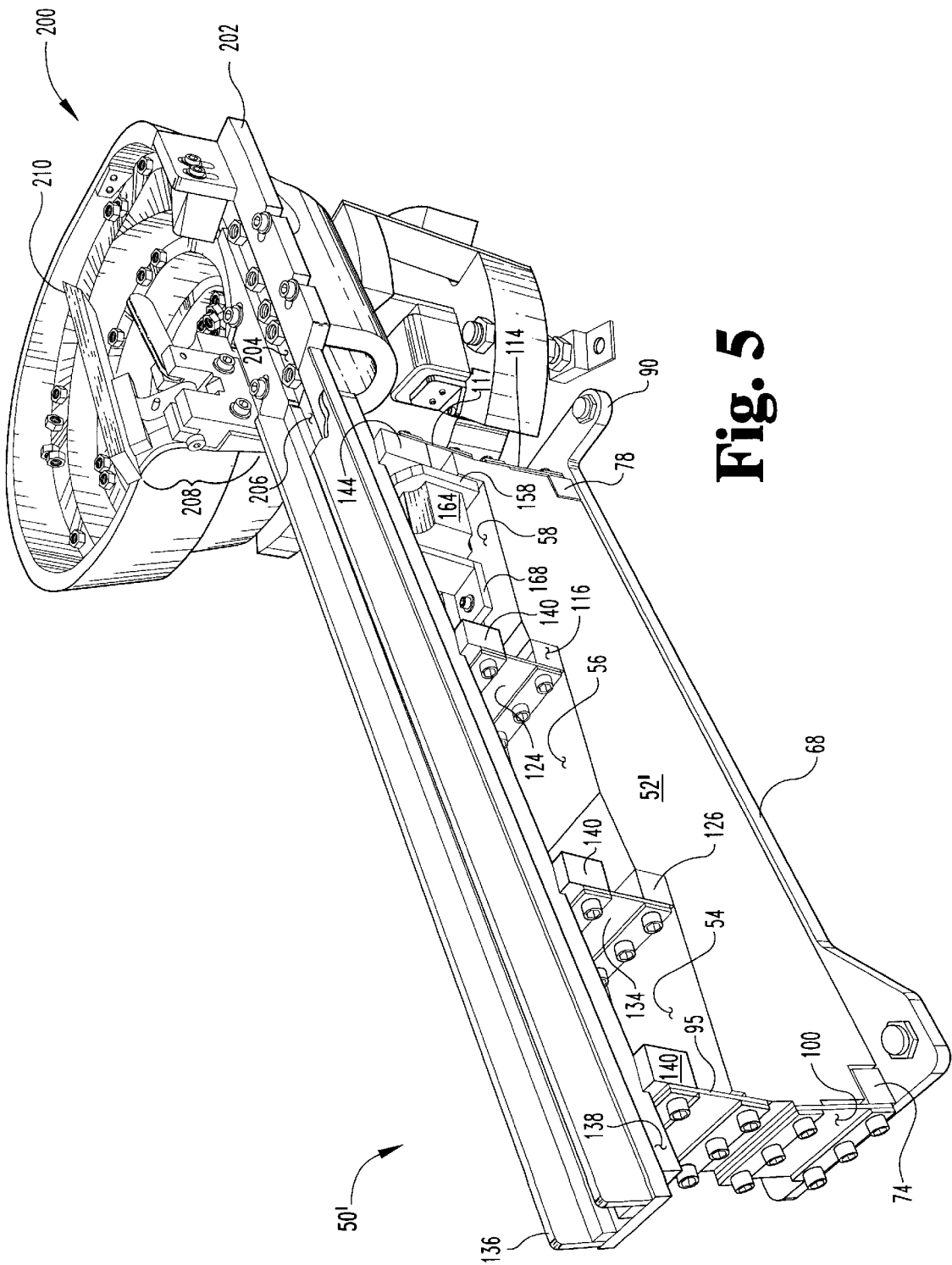
FIG. 5 is a perspective view of the linear vibratory parts feeder of FIG. 3 operatively placed adjacent to a known bowl-type vibratory parts feeder.
Figure 6:
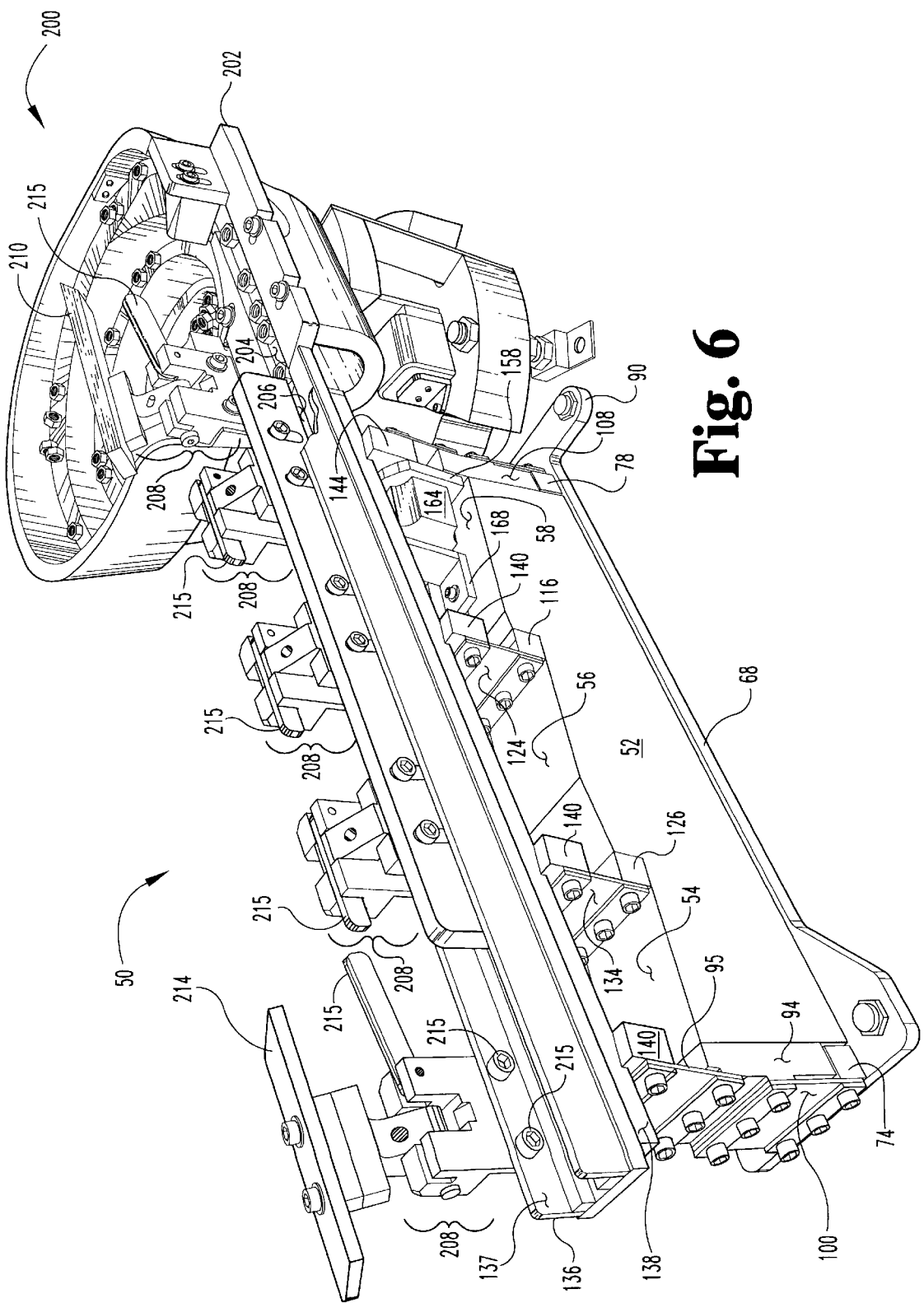
FIG. 6 is a perspective view of the linear vibratory parts feeder of FIG. 2 operatively placed adjacent to a known bowl-type vibratory parts feeder, and illustrating pivotal top confinement members mounted thereto in accordance with another aspect of the present invention.

Mounting plate 66 further defines a plurality of mounting bores therethrough which are sized to receive fasteners 85 therethrough. Preferably, fasteners 85 are threaded and a corresponding number of threaded nuts are provided for securing plate 66 to a suitable mounting surface. Advantageously, plate 66 defines a mounting tab 90 extending laterally away from end 88 thereof, wherein mounting tab 90 defines one such mounting bore 92 therethrough. As illustrated in FIGS. 5 and 6, the location of mounting tab 90 relative to the end 88 of mounting plate 66 permits an upstream feeder component, such as a vibratory bowl-type parts feeder/orienter 200, to be positioned in close proximity to a corresponding end of linear vibratory parts feeder 50 while still permitting operable access to fastener 85 extending through bore 92. Moreover, since mounting plate 66 is reversible such that isolator blocks 74 and 78 may be mounted to either surface 68 or 70 thereof, mounting tab 90 may be conveniently positioned on either side of feeder 50. Such advantageous positioning of mounting tab 90 further permits complete access to isolator block 78 even when fastener 85 extends fully through bore 92. It will be appreciated by those skilled in the art that the reversible nature of mounting block 66, the configuration of mounting tab 90, and its positioning relative to the end 88 of mounting plate 66, provides a significant improvement over prior art mounting plates such as that shown and described with respect to FIG. 1. Mounting plate 66 further defines a pair of similar mounting bores 82 and 84 at the opposite end 72 thereof, wherein mounting plate 66 is configured such that bores 82 and 84 are positioned on either side of counterweight 52 when counterweight 52 is mounted thereto. Thus, in one preferred embodiment, mounting plate 66 defines three such mounting bores 82, 84 and 92 therethrough for securing linear vibratory parts feeder 50 to a suitable support surface, wherein all such bores are strategically positioned relative to plate 66 such that easy access may be had to fasteners 85, and such that fasteners 85 do not interfere either with access to the various components of feeder 50 or with positioning of upstream or downstream feeder units.

Referring again to FIG. 2, linear vibratory parts feeder 50 further includes a number of lower spring mounting anchors detachably mounted to counterweight 52. One such lower spring mounting anchor 94 has a mounting face 96 configured to mount to a similarly configured face 60 of counterweight 52, and defines a plurality bores 98, preferably three, therethrough. An isolator spring 100 defines an identical number of bores therethrough adjacent one end thereof which are aligned with bores 98, and a corresponding number of fasteners 102 preferably extend through a leaf washer 104, through isolator spring 100 and bores 98 of lower spring anchor 94, and into engagement with a corresponding number of bores defined in end face 60 of counterweight 52. Isolator spring 100 further defines a number of bores therethrough adjacent an opposite end thereof which are aligned with a corresponding number of bores defined within isolator block 74. Fasteners 102 preferably extend through a leaf washer 104, through isolator spring 100 and into engagement with the corresponding number of bores defined within isolator block 74. Preferably, the bores defined within end face 60 and the bores defined within isolator block 74 are threaded, as are fasteners 102, so that lower spring anchor 94 and isolator spring 100 may be detachably mounted to the end face 60 of counterweight 52 and to isolator block 74. An outer face 97 of lower spring anchor 94 further defines a number of bores therein which align with a corresponding number of bores defined adjacent one end of a drive spring 95. Fasteners 102 preferably extend through leaf washer 104, through drive spring 95 and into engagement with the corresponding number of bores defined within outer face 97 of lower spring anchor 94. Preferably, the bores defined within the outer face 97 of lower spring anchor 94 are threaded, as are fasteners 102, so that drive spring 95 may be detachably mounted to lower spring anchor 94.

Another lower spring mounting anchor 106 has a mounting face 108 configured to mount to a similarly configured face 62 of an opposite end of counterweight 52, and defines a plurality bores 110, preferably three, therethrough. An isolator spring 114 defines an identical number of bores therethrough adjacent one end thereof which are aligned with bores 110, and a corresponding number of fasteners 102 preferably extend through a leaf washer 104, through isolator spring 114 and bores 110 of lower spring anchor 106, and into engagement with a corresponding number of bores 112 defined in end face 62 of counterweight 52. Isolator spring 114 further defines a number of bores therethrough adjacent an opposite end thereof which are aligned with a corresponding number of bores 75 defined within isolator block 78. Fasteners 102 preferably extend through a leaf washer 104, through isolator spring 114 and into engagement with bores 75 defined within isolator block 78. Preferably, the bores 112 defined within end face 62 and the bores defined within isolator block 78 are threaded, as are fasteners 102, so that lower spring anchor 106 and isolator spring 114 may be detachably mounted to the end face 62 of counterweight 52 and to isolator block 78. Counterweight 52 is thus preferably detachably mounted to mounting plate 66 via the known isolator block 74, 78 and isolator spring 100, 114 arrangement, wherein an air gap of predetermined width exists between the counterweight 52 and mounting plate 66, and between the counterweight 52 and each isolator block 74 and 78 (see FIG. 4).

An outer face 117 of lower spring anchor 106 further defines a number of bores 115 therein which align with a corresponding number of bores defined adjacent one end of a drive spring 117. Fasteners 102 preferably extend through leaf washer 104, through drive spring 117 and into engagement with the corresponding number of bores 115 defined within outer face 117 of lower spring anchor 106. Preferably, the bores 115 defined within the outer face 117 of lower spring anchor 106 are threaded, as are fasteners 102, so that drive spring 117 may be detachably mounted to lower spring anchor 106.

Yet another lower spring anchor 116 defines a number of bores 122, preferably two, therethrough which align with a corresponding pair of bores defined within surface 56 of counterweight 52 adjacent wall 120 thereof. Preferably, the bores defined within the surface 56 of counterweight 52 are threaded, as are fasteners 102, and fasteners 102 extend through bores 122 and into engagement with the number of bores defined within the surface 56 of counterweight 52 to thereby detachably mount lower spring anchor 116 to counterweight 52. Lower spring anchor 116 further defines a second set of bores therein which align with a corresponding set of bores defined through drive spring 124 adjacent one end thereof. Preferably, the second set of bores defined within lower spring anchor 116 are threaded, as are fasteners 102, and fasteners 102 preferably extend through leaf washer 104, through drive spring 124 and into engagement within the second set of bores defined within lower spring anchor 116 to thereby detachably mount drive spring 124 to lower spring anchor 116.

Still another lower spring anchor 126 defines a number of bores 132, preferably two, therethrough which align with a corresponding pair of bores defined within surface 54 of counterweight 52 adjacent wall 130 thereof. Preferably, the bores defined within the surface 54 of counterweight 52 are threaded, as are fasteners 102, and fasteners 102 extend through bores 132 and into engagement with the number of bores defined within the surface 54 of counterweight 52 to thereby detachably mount lower spring anchor 126 to counterweight 52. Lower spring anchor 126 further defines a second set of bores therein which align with a corresponding set of bores defined through drive spring 134 adjacent one end thereof. Preferably, the second set of bores defined within lower spring anchor 126 are threaded, as are fasteners 102, and fasteners 102 preferably extend through leaf washer 104, through drive spring 134 and into engagement within the second set of bores defined within lower spring anchor 126 to thereby detachably mount drive spring 134 to lower spring anchor 126.

Linear vibratory parts feeder 50 further includes a linear, or "straight line" parts transport track 136 having a suitable parts transport channel 206 formed therein (see FIGS. 5 and 6) and a track mounting block 138 either permanently attached to, or formed integral with, the bottom surface of track 136. A plurality of upper spring anchors are detachably mountable to track mounting block 138 at predetermined positions along block 138 so as to attach to drive springs 95, 117, 124 and 134. In the embodiment 50 illustrated in FIG. 2, four such upper spring anchors are provided. Preferably, three of the upper spring anchors 140 are identically configured and the fourth 144 is configured to detachably mount to a known vibratory drive mechanism such as, for example, an armature plate 158 of an electromagnetic drive unit. Preferably, upper spring anchor 144 is positioned adjacent to the parts receiving end of parts transport track 136, as illustrated in FIG. 2, so that the vibratory drive mechanism is situated at the parts receiving end of feeder 50. However, the present invention contemplates that the vibratory drive mechanism may be positioned adjacent to any of the upper spring anchors so that upper spring anchor 144 may be positioned at any of the upper spring anchor locations.

Each upper spring anchor 140 defines a drive spring mounting face 142 in which a number, preferably three, of bores are defined which align with corresponding bores defined through opposite ends of drive springs 95, 124 and 134. Upper spring anchor 144 similarly defines a drive spring mounting face 146 in which three bores 148 are defined which align with corresponding bores defined through an opposite end of drive spring 117. Each of the upper spring anchors 140 and 144 define a parts track mounting surface 150 in which a number, preferably two, of bores 152 are defined which align with corresponding pairs of bores defined in the bottom surface of track mounting block 138. Preferably, each set of bores defined within the bottom surface of track mounting block 138 are threaded, as are fasteners 102, and fasteners 102 are received through bores 152 of each of the upper spring anchors 140 and 144, and into engagement with the corresponding pairs of bores defined within the bottom surface of track mounting block 138 to thereby detachably mount the upper spring anchors 140 and 144 to the parts transport track 136.

Figure 4:
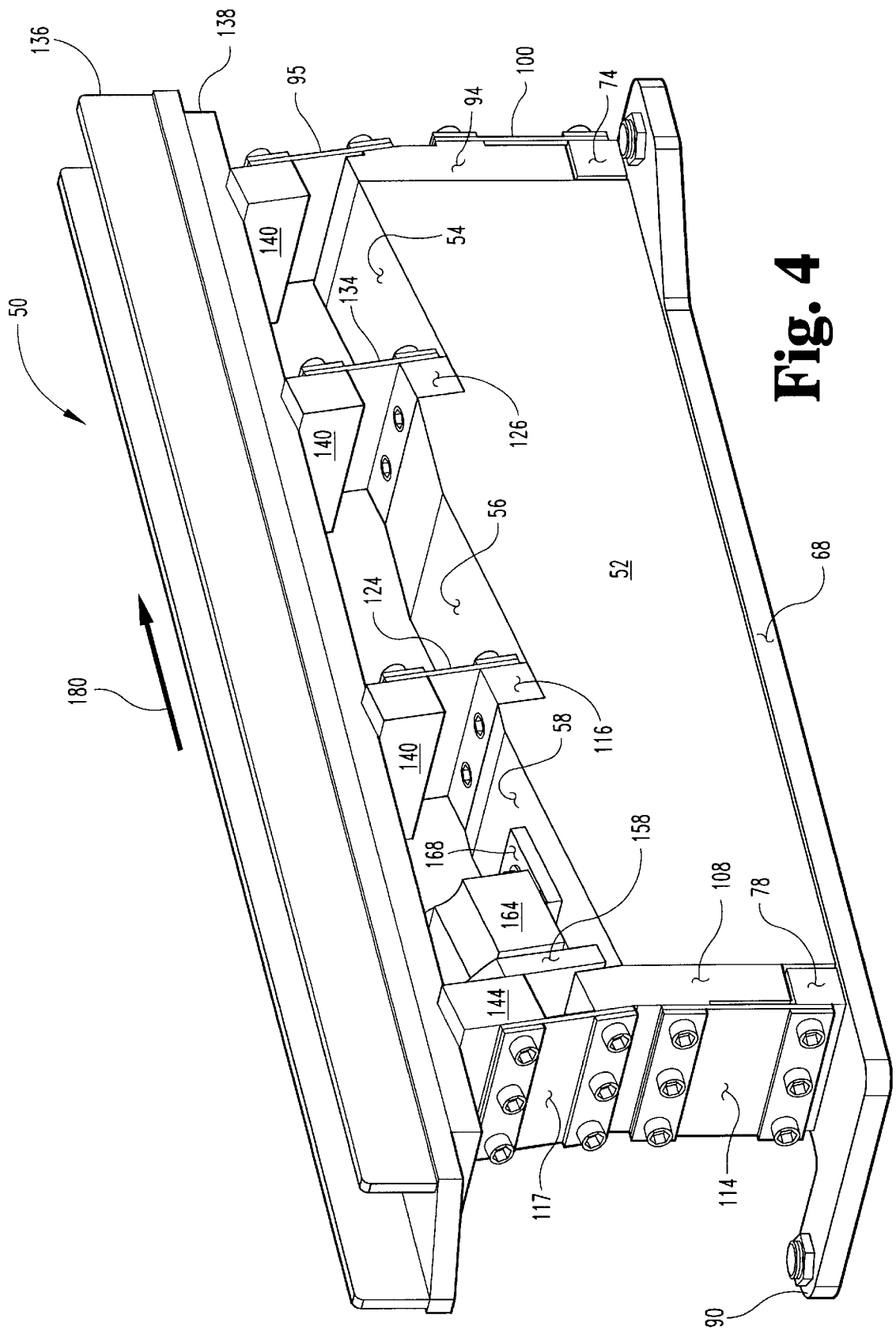
FIG. 4 is a perspective view of the linear vibratory parts feeder of FIG. 2 as assembled.

In a preferred embodiment, each of the parts track mounting surfaces 152 of upper spring anchors 140 and 144 are preferably recessed at an angle approximately equal to the angle of each of the sloped surfaces 54, 56 and 58 of counterweight 52, yet sloped in an opposite direction of these surfaces (see FIG. 4). Thus, as surfaces 54, 56 and 58 slope generally downwardly from end face 60 toward end face 62 of counterweight 52, the parts track mounting surfaces 152 of upper spring anchors 140 and 144 slope generally downwardly from end face 62 toward end face 60 of counterweight 52. As illustrated in FIG. 4, this feature advantageously permits the upper and lower spring anchor pairs to be mounted in juxtaposition relative to each other to thereby maximize the efficiency of drive motion imparted to parts transport track 136 by drive springs 95, 117, 124 and 134. It is to be understood, however, that the present invention contemplates that the recessed surfaces 152 may alternatively be omitted, and the drive spring mounting faces 142 and 146 may be correspondingly formed at an angle to accommodate proper mounting of the drive springs thereto.

The parts transport track 136 is attached in operative relationship to the counterweight 52 by detachably mounting each of the spring mounting faces 142 and 146 to the corresponding drive springs 95, 117, 124 and 134. Thus, fasteners 102, preferably threaded, preferably extend through leaf washers 104 and into threaded engagement within the second set of bores defined within spring mounting faces 142 of upper spring anchors 140 and within the set of bores 148 defined within spring mounting face 146 of upper spring anchor 144 to thereby detachably mount the drive springs thereto. As illustrated in FIG. 2, drive springs 95, 124 and 134 are detachably mounted to corresponding upper spring anchors 140, and drive spring 117 is detachably mounted to upper spring anchor 144.

Upper surface 58 of counterweight 52 defines a bore 174 therein, preferably threaded, which aligns with bore 172 of vibratory driver mounting bracket 168. Fastener 102 extends through bore 172 and into engagement within bore 174 to thereby detachably mount bracket 169 to upper surface 58 of counterweight 52. Bracket 168 further defines a number of bores 170, preferably two, therethrough which align with a corresponding pair of bores defined within a mounting surface 162 of vibratory driver 164. A pair of fasteners 102 extend through bores 170 and into engagement within the corresponding bores defined within the mounting surface 162 of vibratory driver 164 to thereby detachably mount vibratory driver 164 to bracket 168. Preferably, vibratory driver 164 is a known elecromagnetic driver having a drive face 162 that is juxtaposed with a corresponding drive face 160 of armature plate 158. Drive faces 160 and 162 are suitably positioned relative to one another to provide an air gap therebetween, and the electromagnetic drive unit comprising driver 164 and armature plate 158 is operable as is known in the art to impart a vibratory drive force to parts transport track 136 via drive springs 95, 117, 124 and 134. For example, in operation, the vibratory drive unit is periodically energized and de-energized. When energized, the drive face 162 of vibratory drive 164 attracts drive face 160 of armature plate under magnetic force to thereby cause the parts transport track 136 to move generally in the direction of arrow 180 (FIG. 4). When de-energized, the magnetic force is no longer present, and the parts transport track 136 moves generally in a direction opposite arrow 180 under the force of the plurality of drive springs 95, 117, 124 and 134. It is to be understood, however, that the present invention contemplates that other known vibratory drive mechanisms may be used with the linear vibratory parts feeder of the present invention to provide vibratory drive motion therefore.

Referring to FIG. 4, which illustrates linear vibratory parts feeder 50 fully assembled, the direction of parts flow is indicated by arrow 180. As assembled, each drive spring 95, 117, 124 and 134 is inclined from counterweight 52 toward parts transport track 136 at a predefined angle in a direction toward drive spring 117. With this known configuration, electromagnetic drive unit, comprising electromagnetic driver 164 and armature plate 158, is operable to lift parts transport track 136 upwardly away from counterweight 52 and in the direction of arrow 180, as is known in the art, to transport parts along track 136. As illustrated in FIG. 4, the electromagnetic drive unit, comprising electromagnetic driver 164 and armature plate 158, is operable to drive each of the drive springs 95, 117, 124 and 134 in a direction generally perpendicular thereto.

Figure 3:
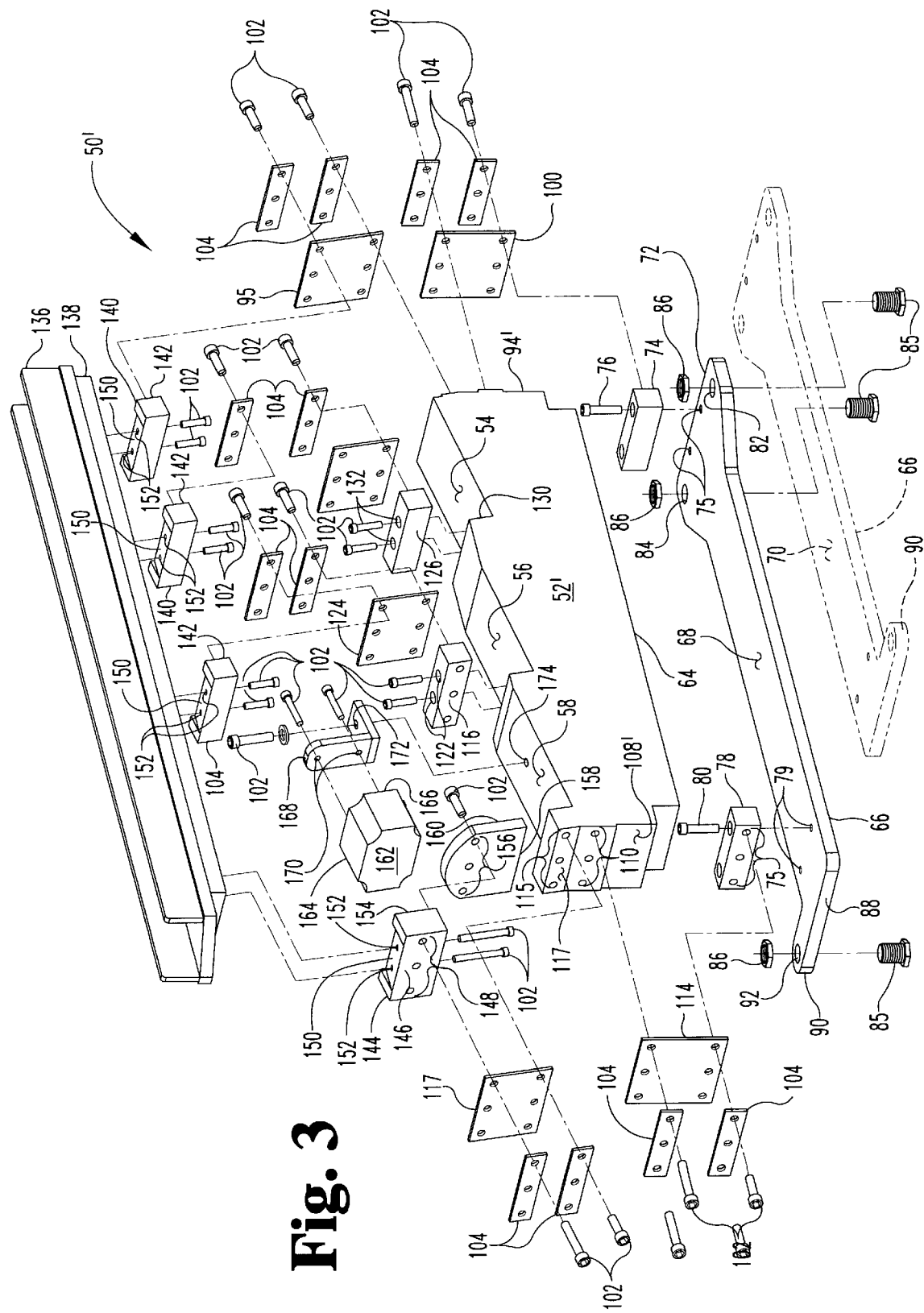
FIG. 3 is an assembly drawing illustrating an alternate embodiment of the linear vibratory parts feeder of the present invention.

Referring now to FIG. 3, an alternate embodiment of a linear vibratory parts feeder 50', in accordance with the present invention, is shown. Feeder 50' is identical in most respects to feeder 50 illustrated in FIGS. 2 and 4, and like components are therefore identified with like numbers. For brevity's sake, the various components of feeder 50' that have been previously described will not be described further here. Unlike feeder 50, feeder 50' includes an alternately configured counterweight 52'. Counterweight 52' is identical to counterweight 52, with the exception that lower spring anchors 94' and 108' are, in this embodiment, formed integral with counterweight 52'. In all other respects, feeder 50' is identical to feeder 50.

In either of the embodiments 50 and 50' shown and described, all of the various components thereof, with the exception of the drive springs, isolator springs, washers and fasteners, are preferably formed in accordance with a known machining process.

Referring now to FIG. 6, linear vibratory parts feeder 50 is shown operative positioned adjacent to an upstream vibratory bowl-type feeder 200 in order to illustrate yet another aspect of the present invention. In the embodiment shown in FIG. 6, vibratory bowl-type feeder 200 includes a parts feeding/orienting unit 202 attached to a parts exit location of the vibratory bowl, wherein the unit 202 defines a suitable parts orientation and transport channel 204 therein. Linear parts transport track 136 of feeder 50 defines an identical transport channel 206 therein for maintaining the parts being transported in a predefined orientation. It is to be understood, however, that transport channels 204 and 206 are shown as rectangular channels by way of example only, and that the present invention contemplates that channels 204 and 206 may be alternatively configured in any of a variety of shapes to properly orient and transport parts having other shapes and sizes, as is known in the art.

Vibratory bowl-type feeder 200 further includes a pivotal top confinement unit 208 attached to the bowl adjacent to the parts feeding/orienting unit 202. A parts confining blade 210 is attached to top confinement unit 208, and the blade 210 is pivotable between a first position adjacent to the parts orienting/feeding channel 204 to thereby confine parts therein and a second position remote from the channel 204 as illustrated in FIG. 6. Preferably, top confinement unit 208 includes a locking lever 215 which is operable to lock confinement blade 210 in its parts confining position. Details of the pivotal top confinement unit 208 are fully described in applicant's co-pending U.S. application Ser. No. 08/389,241, filed Feb. 16, 1995, entitled VIBRATORY PARTS FEEDER WITH PIVOTAL TOP CONFINEMENT, the contents of which are hereby incorporated by reference.

In accordance with the present invention, parts transport track 136' of linear vibratory parts feeder 50 (or 50') includes a number of pivotal top confinement units 208 detachably mounted thereto. Wall 137 of track 136' defines a number of bores therethrough, preferably in sets of two, which align with a number of bores defined in pivotal top confinement units 208. Fasteners 215, preferably threaded, extend through the bores defined in wall 137 and into engagement within the bores defined in the pivotal top confinement unit 208 which are also preferably threaded. Thus, a number of pivotal top confinement units 208 may be detachably mounted to parts transport track 136'. Although four such pivotal top confinement units 208 are illustrated in FIG. 6, the present invention contemplates providing for attachment of any number of such units 208 to track 136'.

In a preferred embodiment, all but the most downstream pivotal top confinement unit share a common confinement blade 212, and the most downstream unit 208 has a separate shorter confinement blade 214 operatively attached thereto. However, the present invention contemplates alternate embodiments wherein each unit 208 has a separate confinement blade attached thereto, wherein a single elongated confinement blade is shared by all units 208, and any combination therebetween.

The present invention is illustrated and described in detail in the drawings and foregoing description, the same is to be considered as illustrative and not restrictive in character, it being understood that only the preferred embodiments have been shown and described and that all changes and modifications that come within the spirit of the invention are desired to be protected.

What is claimed is:

1. A linear vibratory parts feeder comprising:
   a counterweight;
   a linear parts track including a track mounting block operably attached thereto;
   a plurality of lower spring anchors detachably mounted to said counterweight;
   a corresponding plurality of upper spring anchors detachably mounted to said track mounting block;
   a plurality of drive springs, each of said drive springs detachably mounted to a corresponding pair of said plurality of upper and lower spring anchors; and
   means for vibrating said linear parts track relative to said counterweight.

2. The linear vibratory parts feeder of claim 1 wherein said means for vibrating said linear parts track relative to said counterweight includes:
   an armature plate detachably mounted to one of said plurality of upper spring anchors; and
   an electromagnetic drive unit detachably mounted to a top surface of said counterweight opposite said linear parts track, said drive unit operable to attract said armature plate thereto in a first direction under magnetic force to thereby cause said linear parts track to move in said first direction against a force of said plurality of drive springs, said plurality of drive springs forcing said linear parts track to move in a second direction opposite said first direction when said magnetic force is not present.

3. The linear vibratory parts feeder of claim 1 wherein each of said plurality of drive springs is inclined from said counterweight toward said linear parts track at a predefined angle.

4. A linear vibratory parts feeder comprising:
   a counterweight;
   a linear parts track;
   a plurality of lower spring anchors detachably mounted to said counterweight;
   a corresponding plurality of upper spring anchors detachably mounted to said linear parts track;
   a plurality of drive springs, each of said drive springs detachably mounted to a corresponding pair of said plurality of upper and lower spring anchors, each of said plurality of drive springs being inclined from said counterweight toward said linear parts track at a predefined angle;
   means for vibrating said linear parts track relative to said counterweight;
   and wherein portions of a top surface of said counterweight are sloped away from said linear parts track in a first direction at said predefined angle;
   and wherein at least some of said plurality of lower spring anchors are detachably mounted to said portions of said top surface of said counterweight with corresponding ones of said drive springs extending perpendicularly away from said portions of said top surface.

5. The linear vibratory parts feeder of claim 4 wherein said counterweight defines first and second end surfaces at opposite ends of said top surface;

and wherein said plurality of lower spring anchors include first and second end members detachably mounted to said first and second end surfaces respectively.

6. The linear vibratory parts feeder of claim 4 wherein a top surface of each of said plurality of upper spring anchors is sloped away from said linear parts track in a second direction opposite said first direction, said plurality of upper spring anchors being detachably mounted to said linear parts track with said top surfaces of said upper spring anchors in contact with said linear parts track.

7. The linear vibratory parts feeder of claim 6 wherein said means for vibrating said linear parts track relative to said counterweight includes means for driving each of said drive springs in a direction perpendicular thereto.

8. The linear vibratory parts feeder of claim 1 wherein said means for vibrating said linear parts track relative to said counterweight includes:
- an armature plate detachably mounted to one of said plurality of upper spring anchors and extending toward said counterweight, said armature plate defining a plate surface positioned parallel to said drive springs; and
- an electromagnetic drive unit detachably mounted to one of said portions of said top surface adjacent said armature plate, said drive unit defining a driver surface positioned parallel to said plate surface.

9. A linear vibratory parts feeder comprising:
- a counterweight;
- a linear parts track;
- a plurality of lower spring anchors detachably mounted to said counterweight;
- a corresponding plurality of upper spring anchors detachably mounted to said linear parts track;
- a plurality of drive springs, each of said drive sprints detachably mounted to a corresponding pair of said plurality of upper and lower spring anchors;
- means for vibrating said linear parts track relative to said counterweight;
- and wherein said counterweight defines a parts receiving end, an opposite parts supply end, and a pair of side portions extending therebetween;
- and further including a mounting plate detachably mounted to said counterweight and extending along an underside thereof between said parts receiving and supply ends, said mounting plate defining a number of bores therethrough adjacent either of said side portions and away from a longitudinal axis extending between said parts receiving and supply ends of said counterweight, each of said bores adapted to receive a fastener therein for securing said counterweight to another surface.

10. The linear parts feeder of claim 9 wherein said mounting plate defines one of said number of bores adjacent one of said parts receiving and supply ends and another one of said number of bores adjacent the other of said parts receiving and supply ends.

11. The linear parts feeder of claim 9 further including:
- a pair of isolator members, each of said isolator members detachably mounted to said mounting plate adjacent opposite ends thereof; and
- a pair of isolator springs, each of said isolator springs mounted between one of said isolator members and a corresponding one of said parts receiving and supplying ends of said counterweight;
- wherein said counterweight, said isolator members and said mounting plate define an air gap therebetween.

12. The linear vibratory parts feeder of claim 1 further including a first top confinement member pivotably attached to said linear parts track, said first top confinement member pivotable between a first position adjacent said linear parts track and a second position remote from said linear parts track, said first top confinement member operable in said first position to confine parts moving through said linear parts track in a predetermined orientation.

13. The linear vibratory parts feeder of claim 12 further including means for locking said first top confinement member in said first position.

14. The linear vibratory parts feeder of claim 12 wherein said linear parts track defines a parts receiving end and a parts supply end;
- and further including a second top confinement member pivotably attached to said linear parts track adjacent said parts supply end thereof, said second top confinement member pivotable to a first position adjacent said linear parts track and a second position remote from said linear parts track, said second confinement member operable in said first position thereof to confine parts in said predetermined orientation along only a short portion of said linear parts track adjacent said parts supply end.

15. A linear vibratory parts feeder comprising:
- a counterweight defining a top surface, an opposite bottom surface, a pair of side portions extending therebetween, a first end and a second opposite end, said counterweight defining a longitudinal axis therebetween;
- a linear parts track;
- a plurality of drive springs connected between said top surface of said counterweight and said linear parts track;
- means for vibrating said linear parts track relative to said counterweight against a force of said plurality of drive springs; and
- a mounting plate detachably mounted to said counterweight and extending along said bottom surface thereof, said mounting plate defining a plurality of bores therethrough adjacent either of said side portions of said counterweight and away from said longitudinal axis, each of said bores adapted to receive a fastener therethrough for securing said mounting plate to a support surface.

16. The linear parts feeder of claim 15 wherein said mounting plate defines one of said number of bores adjacent said one end of said counterweight yet away from said longitudinal axis, and another one of said number of bores adjacent said opposite end of said counterweight yet away from said longitudinal axis.

17. The linear parts feeder of claim 16 further including:
- a first isolator member detachably mounted to said mounting plate adjacent one end thereof;
- a second isolator member detachably mounted to said mounting plate adjacent an opposite end thereof;
- a first isolator spring connected between said first isolator member and said one end of said counterweight; and
- a second isolator spring connected between said second isolator member and said opposite end of said counterweight;
- wherein said counterweight, said isolator members and said mounting plate define an air gap therebetween.

18. The linear parts feeder of claim 15 wherein said mounting plate defines a first mounting surface on one side thereof and a second mounting surface on an opposite side thereof, said counterweight detachably mountable to either of said first and second mounting surfaces.

19. The linear parts feeder of claim 18 further including:
   a first isolator member detachably mounted to one of said first and second mounting surfaces of said mounting plate adjacent one end thereof;
   a second isolator member detachably mounted to said one of said first and second mounting surfaces of said mounting plate adjacent an opposite end thereof;
   a first isolator spring connected between said first isolator member and said one end of said counterweight; and
   a second isolator spring connected between said second isolator member and said opposite end of said counterweight;
   wherein said counterweight, said isolator members and said mounting plate define an air gap therebetween.

20. The linear vibratory parts feeder of claim 19 wherein said first isolator spring is attached to a first end surface of said counterweight, and said second isolator spring is attached to a second end surface of said counterweight.

21. A linear vibratory parts feeder comprising:
   a counterweight defining a longitudinal axis from a first end to an opposite second end thereof, said counterweight having a top surface that is generally sloped downwardly from said first end toward said second end at a predefined angle relative to said longitudinal axis;
   a plurality of drive springs attached at one end to said top surface of said counterweight;
   a plurality of spring mounting members each attached to an opposite end of a corresponding one of said plurality of drive springs, each of said plurality of spring mounting members having a top surface facing away from said top surface of said counterweight and defining a recess therein that is sloped downwardly in a direction opposite said downward slope of said top surface of said counterweight;
   an elongated linear parts track detachably mounted within said recesses of said plurality of spring mounting members; and
   means for vibrating said linear parts track relative to said counterweight against a force of said plurality of drive springs.

22. The linear vibratory parts feeder of claim 1 wherein said counterweight includes a top surface disposed opposite said linear parts track;
   and wherein at least one of said plurality of lower spring anchors is detachably mounted to said top surface.

23. The linear vibratory parts feeder of claim 1 wherein said counterweight is a monolithic structure defining top, bottom, side and end surfaces.

24. The linear vibratory parts feeder of claim 1 wherein said counterweight defines an exterior and said plurality of lower spring anchors are detachably mounted to said exterior.

25. The linear vibratory parts feeder of claim 24 wherein each of said plurality of spring mounting members defines a recess configured to accept a portion of said track mounting block therein.

26. The linear vibratory parts feeder of claim 1 wherein said linear parts track defines a parts flow direction;
   and wherein said vibrating means causes said linear parts track to move in unison in said parts flow direction.

* * * * *